US009553723B2

(12) United States Patent
Nguyen et al.

(10) Patent No.: US 9,553,723 B2
(45) Date of Patent: Jan. 24, 2017

(54) MULTI-DIMENSIONAL ENCRYPTION

(71) Applicant: Unsene, ehf., Reykjavik (IS)

(72) Inventors: Toan Le Tri Nguyen, Danang (VN); Vinh H. Vo, San Jose, CA (US)

( * ) Notice: Subject to any disclaimer, the term of this patent is extended or adjusted under 35 U.S.C. 154(b) by 244 days.

(21) Appl. No.: 14/541,704

(22) Filed: Nov. 14, 2014

(65) Prior Publication Data

US 2016/0142208 A1    May 19, 2016

(51) Int. Cl.
*H04L 9/30* (2006.01)
*H04L 9/08* (2006.01)

(52) U.S. Cl.
CPC .......... *H04L 9/3093* (2013.01); *H04L 9/0861* (2013.01); *H04L 9/308* (2013.01); *H04L 9/3066* (2013.01)

(58) Field of Classification Search
CPC ...... H04L 9/308; H04L 9/3066; H04L 9/3093; H04L 2209/24; H04L 9/0861
See application file for complete search history.

(56) References Cited

U.S. PATENT DOCUMENTS

| | | | | |
|---|---|---|---|---|
| 6,141,420 A * | 10/2000 | Vanstone | ................ | G06F 7/725 380/28 |
| 2006/0072743 A1* | 4/2006 | Naslund | .................. | G06F 7/724 380/28 |
| 2007/0230692 A1* | 10/2007 | Akiyama | .............. | H04L 9/3093 380/44 |

OTHER PUBLICATIONS

"Lecture 7: Finite Fields Part 4: Finite Fields of the Form GF(2^ n) Theoretical Underpinnings of Modern Cryptography" Feb. 5, 2016, Avi Kak, Purdue University.*
FIPS 197 "Announcing the Advanced Encryption Standard" Nov. 2001, NIST, pp. 1-47.*
"Recommendation for Cryptographic Key Generation", Barker et al. Dec. 2012, NIST, pp. 1-21.*
"AES Key Wrap Specification" Nov. 16, 2001, NIST, pp. 1-23.*
"Galois Field in Cryptography" Benvenuto, May 31, 2012, pp. 1-11.*
"The Laws of Cryptography: the Finite Field GF(2^ 8)", http://www.cs.utsa.edu/~wagner/laws/FFM.html, Neal R. Wagner, 2001.*

(Continued)

*Primary Examiner* — Jung Kim
*Assistant Examiner* — Thomas Ho
(74) *Attorney, Agent, or Firm* — Withrow + Terranova, PLLC

(57) ABSTRACT

A method of encrypting data is provided. The method includes generating a key and encrypting data using the key. Generating the key includes determining a number of coefficients for a polynomial having a number of variables and selecting a polynomial level from the number of coefficients. Generating the key also includes selecting a first value based on the polynomial level, generating a vector (c) having coefficients based on the polynomial level, and generating a vector (t) based on the polynomial level. Furthermore, generating the key includes generating a vector (t') based on a product of the vector (c) and the vector (t) and calculating a second value based on the first value, the vector (t), and the product. In addition, generating the key includes comparing the second value with the polynomial level and returning the coefficients of the vector (c) as the number of coefficients for the polynomial.

14 Claims, 5 Drawing Sheets

(56) References Cited

OTHER PUBLICATIONS

"Polynomials over Galois Field", http://www2.siit.tu.ac.th/prapun/ecs455/ece561%2005%2001%20Polynomials%20over%20Galois%20Field.pdf 2005.*

"Lecture 6: Finite Fields Part 3: Polynomial Arithmetic Theoretical Underpinnings of Modern Cryptography" Feb. 5, 2016, Avi Kak, Purdue University.*

"Elliptic Curve Cryptography" Northeastern University, CS 6750, Cryptography and Communication Security, Fall 2009, pp. 1-13.*

CS 6750 Fall 2009 Syllabus, "http://www.ccs.neu.edu/home/riccardo/courses/cs6750-fa09/", Northeastern University Fall 2009.*

SEC 1—Elliptic Curve Cryptography, Version 2.0, Certicom Research May 21, 2009, pp. 1-138.*

Howgrave-Graham, Nick, "A Hybrid Lattice-Reduction and Meet-in-the-Middle Attack Against NTRU," Advances in Cryptology—CRYPTO 2007, vol. 4622 of the series Lecture Notes in Computer Science, 2007, pp. 150-169.

* cited by examiner

MULTI-DIMENSIONAL ENCRYPTION

FIELD OF THE DISCLOSURE

The present invention generally relates to encrypting data and more specifically, to generating keys that are used with an encryption algorithm to encrypt data.

BACKGROUND

In today's computing environments, many users transmit data over unsecure communication paths, such as the Internet. However, the possibility exists that an unauthorized third party may access the data during transmission. In order to protect the data that is being transmitted, users typically encrypt the data such that if an unauthorized third party intercepts the data, the unauthorized third party will not be able to access the data. Typically, the data is encrypted with an encryption algorithm used in conjunction with a key. In many instances, the key is limited to a certain byte and character length, such as 256 bits. In order to gain access to the encrypted data, an unauthorized user must have both the encryption algorithm used to encrypt the data and the key used in conjunction with the encryption algorithm during encryption of the data. Often times, the encryption algorithm is well-known and the unauthorized third party only needs to determine the key that was used during data encryption. Typically, an unauthorized third party develops an algorithm that simply guesses the key using an iterative process. In an example where the key has 256 bytes, the algorithm will iteratively guess keys that have 256 bytes. At some point, the algorithm will guess the correct key and the unauthorized third party may access the encrypted data using the correct key.

In order to prevent an unauthorized third party from accessing encrypted data, what is needed is a method for generating a key that has an infinite length such that an unauthorized third party cannot guess the key in order to decrypt and gain access to data.

SUMMARY

Embodiments of the present invention relate to the encryption and decryption of data. Embodiments of the present invention expand the size of a key that is used with an encryption algorithm to any size extending to infinity that may be used with numerous types of encryption algorithms. An encryption algorithm encrypts and decrypts data in conjunction with a key where a key generation algorithm generates the key to be used with the encryption algorithm. In an embodiment, the key generation algorithm generates the key based on a size of a polynomial that is used to generate the key. In an embodiment, the polynomial includes coefficients that are used with the polynomial to generate the key. Embodiments of the present invention generate the coefficients based on the size of the polynomial. For example, in an embodiment where the polynomial includes eight variables, the polynomial may be as follows:

$$a(x) = \{c1\}x^7 + \{c2\}x^6 + \{c3\}x^5 + \{c4\}x^4 + \{c5\}x^3 + \{c6\}x^2 + \{c7\}x + \{c8\}$$

$$\Rightarrow a^{-1}(x) = \{c9\}x^7 + \{c10\}x^6 + \{c11\}x^5 + \{c12\}x^4 + \{c13\}x^3 + \{c14\}x^2 + \{c15\}x + \{c16\}$$

When the polynomial has eight variables, in an embodiment, a key generation algorithm of the present invention will generate the coefficients (cn) for the polynomial. In an embodiment, with the polynomial a(x), a key will be generated that may be used with an encryption algorithm and a decryption algorithm in order to encrypt and decrypt data.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present invention relate to the encryption and decryption of data. Embodiments of the present invention expand the size of a key that is used with an encryption algorithm to an infinite size that may be used with numerous types of encryption algorithms. An encryption algorithm encrypts and decrypts data in conjunction with a key where a key generation algorithm generates the key to be used with the encryption algorithm. In an embodiment, the key generation algorithm uses a matrix that generates a key based on the number of bytes in a word.

Figure 1:
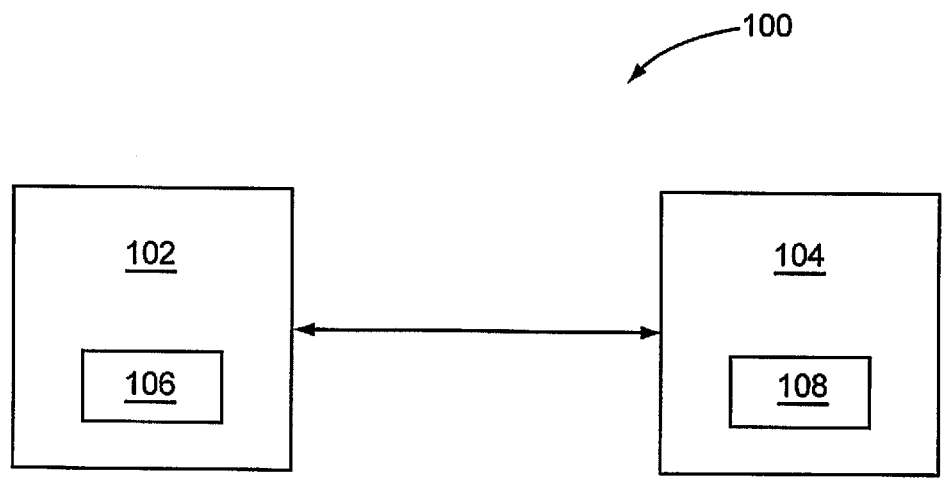
FIG. 1 illustrates a computing environment that includes a user device where embodiments of the present invention may be performed.

FIG. 1 illustrates a computing environment 100 that includes a user device 102 and a user device 104. During normal operation, the user devices 102 and 104 may communicate with each other where data is transmitted between each of the devices 102 and 104. In some embodiments, in order to prevent unauthorized third parties from accessing the transmitted data, the data is encrypted prior to transmittal. For example, the user device 102 may include an encryption algorithm 106 that encrypts the data prior to transmittal. The encryption algorithm 106 may be implemented in hardware, software, or a combination of hardware and software. When the encrypted data is received at the user device 104, an encryption algorithm 108 at the user device 104 then decrypts the transmitted data such that a user associated with the user device 104 may interact with the transmitted data. As with the encryption algorithm 106, the encryption algorithm 108 may be implemented in hardware, software, or a combination of hardware and software. It should be noted that, while the encryption algorithm 106 is described as encrypting data and the encryption algorithm 108 is described as decrypting data, each of the encryption algorithms 106 and 108 are capable of encrypting and decrypting data. Therefore, the encryption algorithm 106 is capable of decrypting data received at the user device 102 and the encryption algorithm 108 is capable of encrypting data sent from the user device 104.

Figure 2:
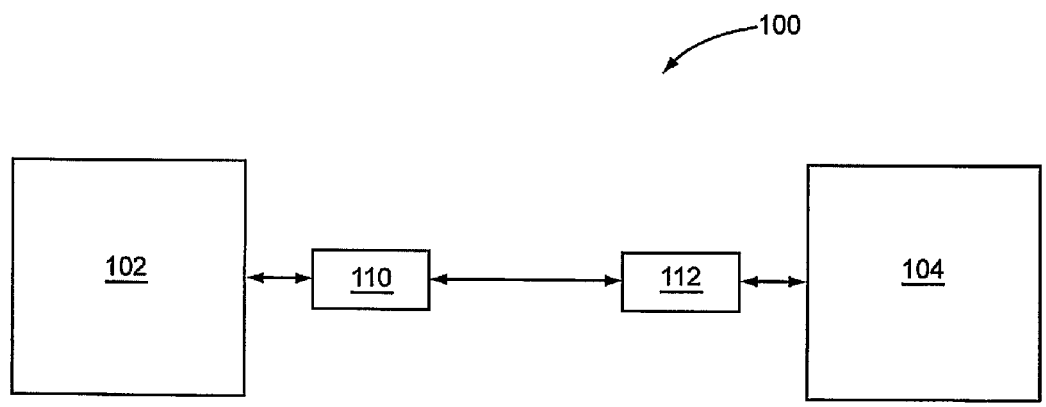
FIG. 2 illustrates an alternative computing environment that includes a user device and servers in accordance with an embodiment of the present invention.

In a further embodiment, as shown with reference to FIG. 2, instead of encryption and decryption occurring at the user devices 102 and 104 via the encryption/decryption algorithms 106 and 108, encryption and decryption may occur at servers 110 and 112. In particular, each of the servers 110 and 112 includes algorithms, such as the encryption/decryption algorithms 106 and 108, and encrypt and decrypt data being transmitted between the user devices 102 and 104.

In one embodiment of the present invention, the user devices 102 and 104 and the servers 110 and 112 may be any type of device, such as a computing device, including a work station, a desktop or laptop computer, or a tablet computer. In addition, each of the client devices 102 and 104 and the servers 110 and 112 may be a mobile computing device including, but not limited to, the Apple® iPhone, the Palm Pre, the Samsung Rogue, the Blackberry Storm, and the Apple® iPod Touch® device. However, the client devices 102 and 104 and the servers 110 and 112 are not limited to these devices. In addition, the users devices may communicate with each other and with the servers 110 and 112 via the Internet and may operate according to the Bluetooth wireless communication standard, the Zigbee wireless communication standard, the Wireless Fidelity (WiFi) wireless communication standard, or the IEEE 802.11 wireless communication standard. However, the communication among these devices is not limited to any of these communication standards and may include any other type of communication standard and medium.

As noted, when the user device 102 transmits data to the user device 104, the encryption algorithm 106 encrypts the transmitted data. In particular, the encryption algorithm 106 applies an encryption algorithm to the data that is to be transmitted in order to encrypt the data. An example of encryption follows. The encryption algorithm 106 uses a key to encrypt the data. Using the Caesar cipher as an example of an encryption algorithm, a letter in plaintext is replaced with a letter some fixed number of positions down the alphabet. To further illustrate, if the letters are shifted by two, then the letter "A," after encryption, would appear as the letter "C." During decryption, the letter is shifted back by two such that the letter "C" appears as the letter "A" after encryption. In other words, the letter is shifted by two during encryption and then shifted back by two during decryption. Thus, the encryption algorithm 106 comprises shifting the letter by a certain amount. In this instance, a key for the algorithm would comprise the number two, such that the encryption algorithm 106, which involves shifting the letter, adds the number two to the letter in order to generate encrypted data. Moreover, the encryption algorithm 106 then subtracts the number two in order to decrypt the data.

While the example above uses the simple Caesar cipher in association with a key for encryption, more complex encryption algorithms such as NTRU, Advanced Encryption Standard (AES), and extended Advanced Encryption Standard (xAES), also use a key as mentioned above in order to encrypt and decrypt data. It should be noted that the encryption algorithm 106 may use any one of these encryption algorithms in accordance with an embodiment of the present invention. The keys associated with these encryption algorithms are significantly more complex than the Caesar cipher and have considerably more characters. Nonetheless, these advanced encryption algorithms use the same principles as the Caesar cipher during encryption and decryption processes. More specifically, each of these encryption algorithms processes data using the encryption algorithm and a key during encryption and decryption. However, the key used with these encryption algorithms have a finite number of bytes. In many instances, these encryption algorithms use a key having 256 bytes, or 32 characters, that are generated using a random number generator. Based on this finite number of keys, unauthorized third parties may correctly guess the key and then, in conjunction with the encryption algorithm, decrypt the encrypted content. In other words, unauthorized third parties may use the key with the encryption algorithms noted above to decrypt encrypted data.

Embodiments of the present invention expand the size of the key such that a key used with these encryption and decryption algorithms has an infinite number of bytes. As such, unauthorized third parties may not be able to correctly guess the key and then, in conjunction with the encryption algorithm, decrypt encrypted content. In particular, instead of using a fixed value as the key that is used in conjunction with the encryption algorithm, a variable polynomial is used to generate the key. An example of a polynomial that is used to generate a key is as follows:

$$a(x) = 18x^{15} + 11x^{14} + 22x^{13} + 24x^{12} + 10x^{11} + 16x^{10} + 6x^9 + 22x^8 + 17x^7 + 12x^6 + 6x^5 + 14x^4 + 28x^3 + 5x^2 + 7x + 2$$

In addition, a polynomial to generate a key for use during decryption is as follows:

$$a^{-1}(x) = 47x^{15} + 253x^{14} + 107x^{13} + 154x^{12} + 191x^{11} + 18x^{10} + 240x^9 + 186x^8 + 183x^7 + 148x^6 + 58x^5 + 72x^4 + 138x^3 + 169x^2 + 33x + 14$$

In accordance with an embodiment of the present invention, the polynomial used to generate a key for use during decryption is an inverse of the polynomial used to generate a key for encryption.

Figure 3A:
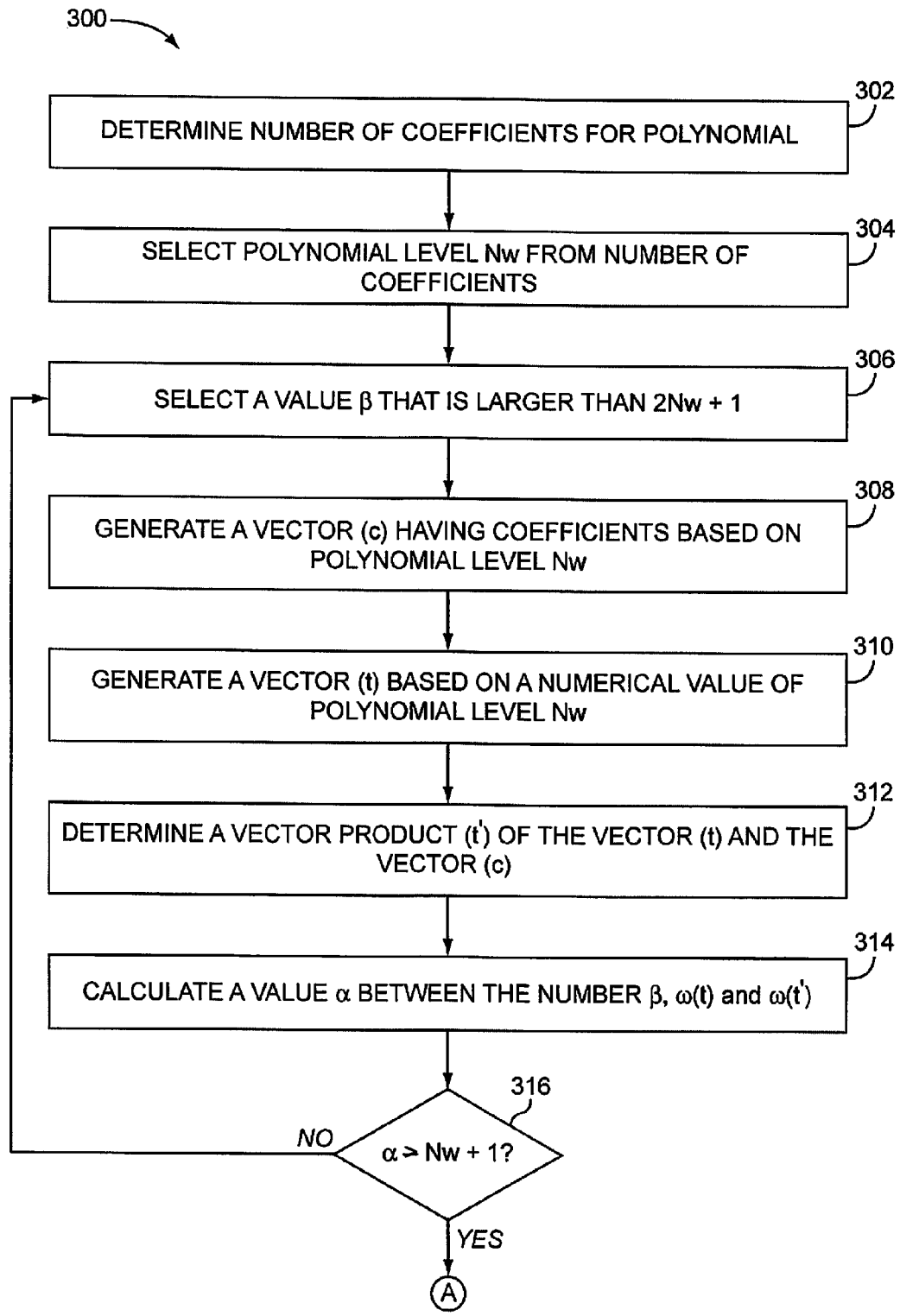
FIGS. 3A and 3B illustrates a key generation algorithm used to generate coefficients for a polynomial that is used during the encryption and decryption of data in accordance with an embodiment of the present invention.
Figure 3B:
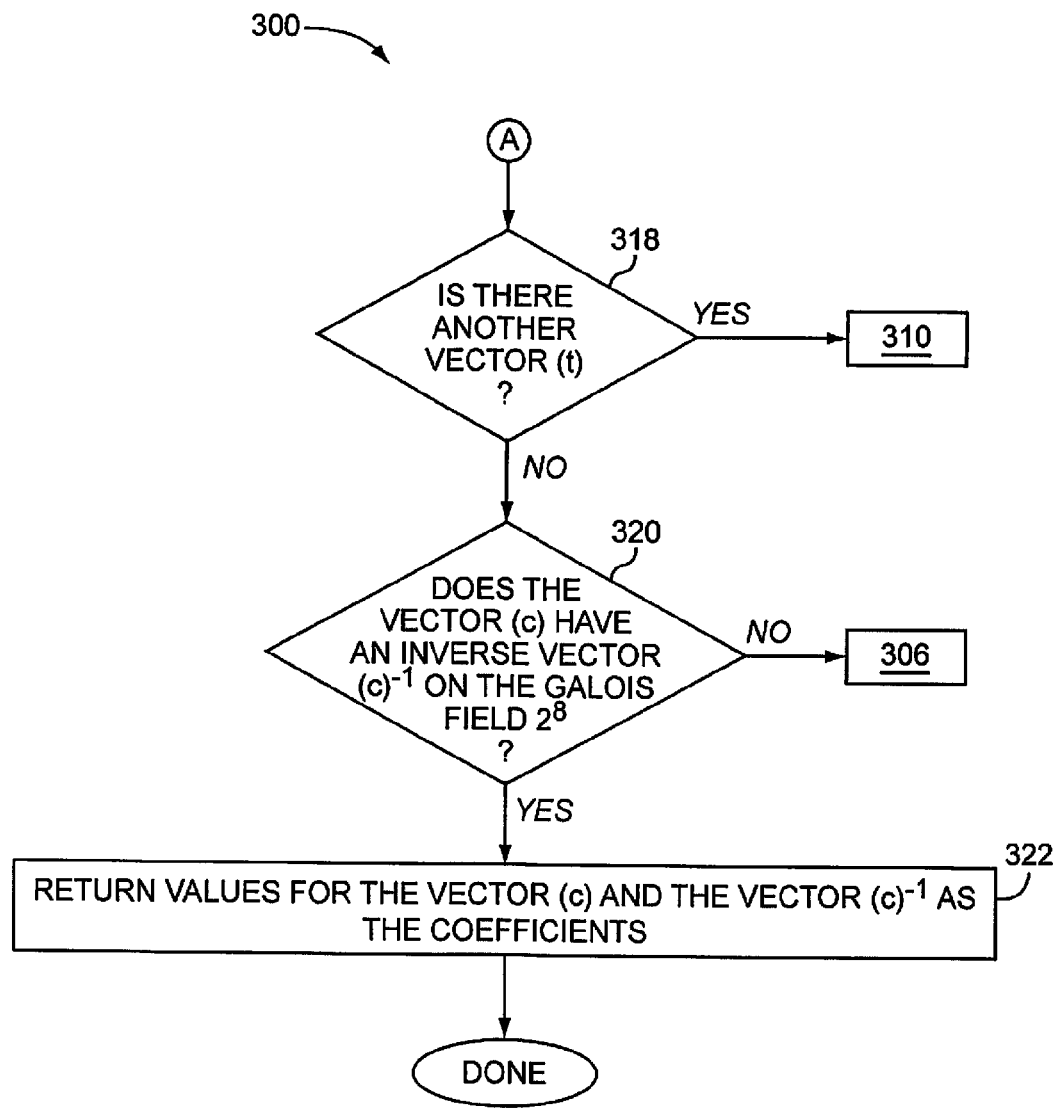

The polynomial includes variables "x" associated with coefficients, where the coefficients are denoted by the values listed in the ellipses { . . . }. The variable "x" denotes any value that may be used when generating the key using the polynomial above. For example, the variable "x" may be any value between zero and infinity. The coefficients are generated using an algorithm as discussed with reference to FIG. 3.

An example of a key generation algorithm 300 that may be used to generate the coefficients mentioned above is shown with reference to FIG. 3. In an embodiment, the key generation algorithm 300 is used to generate coefficients for the polynomial to be used to generate a key for encryption. The key generation algorithm 300 is also used to generate coefficients for the polynomial to be used to generate a key for decryption. As will be detailed below, in an embodiment, the coefficients used to generate a key for decryption are an inverse of the coefficients used to generate the key for encryption. Initially, in a step 302, the coefficients for a polynomial that is to be used for the polynomial are determined. In particular, a user may provide a number that the key generation algorithm 300 may use to determine the number of coefficients for the polynomial. For example, a user may decide to use three coefficients from the polynomial. It should be noted that the value of three is provided for demonstrative purposes only and any values may be provided. It should also be noted that the number may be any value and extend to infinity. In an embodiment, the number of coefficients selected dictates the number of variables "x" will be used in the polynomial, where "x" is the same value and is raised to a different power, i.e. $x^n$, based on the number of coefficients selected. To further illustrate, when the number of coefficient selected is six, the number of variables in the polynomial will be six, as shown below:

$$a(x) = x^5 + x^4 + x^3 + x^2 + x + x^0$$

As another example, if the number four is selected, the number of variables in the polynomial will be four, as shown below:

$$a(x) = x^3 + x^2 + x + x^0$$

After the number of coefficients to be used for the polynomial is determined in the step 302, a polynomial level Nw is then selected from the number of coefficients in a step 304. In an embodiment, the number corresponds to a number within the number of coefficients. For example, from the numbers six, eight, zero, and three, the number three is selected in the step 304 as the polynomial level Nw.

After the polynomial level Nw is selected in the step 304, the key generation algorithm 300 performs the step 306, where a value β that is larger than 2Nw+1 is selected. Turning back to the example, the number 12 is selected as the value β, where 12>2(3)+1, in the step 304. Once the value β is selected in the step 306, the key generation algorithm 300 performs the step 308, where a vector (c) having random coefficients is generated based on the polynomial level Nw. It should be noted that the random coefficients for the vector (c) correspond to the coefficients mentioned above to be used in the polynomial a(x). To further illustrate, if the value of the polynomial level Nw is four, then the key generation algorithm 300 will randomly select four coefficients having a numerical value between the range of 1 and 255. Turning back to the example, since three was selected for the polynomial level Nw, the key generation algorithm 300 will randomly select a vector (c) of three coefficients having values of (255, 3, 16) in the step 308.

Once the key generation algorithm 300 randomly selects coefficients in the step 308, the key generation algorithm 300 performs the step 310. In the step 310, the key generation algorithm 300 generates a vector (t) having a binary format where the values for the vector (t) are selected based on the numerical value of the polynomial level Nw. In particular, the number of vectors that correspond to the vector (t) that are generated are dependent on the value of the polynomial level Nw. To further illustrate, if the numerical value of the polynomial level Nw was three, then there are six possible combinations for the vector (t). These combinations are (0, 0, 1), (0, 1, 0), (0, 1, 1), (1, 1, 1), (1, 1, 0), and (1, 0, 1), where all of the vectors have the integer 1. In other words, when the numerical value of the polynomial level Nw is three, there are six vectors for the vector (t), where all the vectors at least have the integer 1. Likewise, if the numerical value for the polynomial level Nw was two, then there are three possible combination for the vector (t) again where all the vectors at least have the integer 1. These combinations are (1,0), (1,1), and (0,1). Stated differently, when the numerical value of the polynomial level Nw is two, there are three vectors for the vector (t) where all the vectors at least have the integer 1. Turning back to the example, as mentioned above, the numerical value of the polynomial level Nw was three, therefore there are six vectors in binary format for the vector (t), where the vectors have the values (0, 0, 1), (0, 1, 0), (0, 1, 1), (1, 1, 1), (1, 1, 0), and (1, 0, 1). In the example, the key generation algorithm 300 selects a vector (t) of (0, 1, 1) in the step 310. After the vector (t) is determined in the step 310, a product of the vector (c) and the vector (t) is determined in a step 312.

In the step 312, the key generation algorithm 300 generates a vector (t'). In an embodiment, the vector (t') is a Galois Field $2^8$ product of the vector (c) and the vector (t). Returning to the example, as noted above, the vector (c) is (255, 3, 16) and the vector (t) is (0, 1, 1). Therefore, the Galois Field $2^8$ product of (255, 3, 16) and (0, 1, 1) is (19, 239, 252). The Galois Field $2^8$ product is well known in the art such that one skilled in the art can readily calculate the Galois Field $2^8$ of two vectors as described above. In the example, the values (19, 239, 252) correspond to the vector (t').

After the vector (t') is calculated in the step 312, the key generation algorithm 300 calculates a value a in a step 314. In the step 314, the key generation algorithm 300 sums the non-zero elements of the vector (t) in order to calculate ω(t). To further illustrate, when the vector (t) has a value of (1, 1, 1, 0), the sum of the non-zero elements ω(t) for this vector will be three, since there are three instances of the number one and one instance of the number zero. The key generation algorithm 300 also sums the non-zero elements of the vector (t') in order to calculate ω(t'). As an illustration, when the vector (t') has a value of (85, 293, 325, 72), the sum of the non-zero elements ω(t) will be four. The sum of ω(t) and ω(t') is then compared with the value β and the smaller of the two is selected as a in the step 314. Thus, in step 314, ω(t) and ω(t') are summed for a value of seven (3+4=7). Finally, in the step 314, the sum of ω(t) and ω(t') is compared with the value β, which in this illustration is eight, such that a value for α would be seven, which is less than eight. Turning back to the example, the value for β is 12, and the sum of the non-zero elements ω for the vector (t) is two, since the vector (t) has two ones and one zero. Moreover, in the example, the sum of the non-zero elements ω for the vector (t') is 3 such that sum of ω(t) and ω(t') is five. Thus, in this example, the value for a is five since five is smaller than 12. Once the value for a is determined in the step 314, the key generation algorithm 300 performs a step 316.

In the step 316, the key generation algorithm 300 determines if a is greater than the polynomial level Nw+1. If a is greater than the polynomial level Nw+1, the key generation algorithm 300 performs a step 318. Otherwise, the key generation algorithm 300 repeats the steps 306 through 314. Turning back to the example, the value for a is five.

Moreover, the value associated with the polynomial level Nw is three such that Nw+1 is (3)+(1) for a value of four. In this example, five is greater than four, thus the step 318 is performed.

When α is greater than the polynomial level Nw+1, the key generation algorithm 300 performs the step 318. In the step 318, the key generation algorithm 300 determines if there is another vector for the vector (t) for which steps 310-316 should be repeated. As noted above, a number of vectors for the vector (t) is dependent on the value of the polynomial level Nw. If the value of the polynomial level Nw is three, there will be six vectors for the vector (t). Thus, if the steps 310 through 316 have only been performed for one vector (t), the key generation algorithm 300 will determine that there are five additional vectors for the vector (t) for which the steps 310 through 316 should be performed. Turning back to the example, as noted above, there are six vectors for the vector (t). Accordingly, in the step 318, the key generation algorithm 300 will repeat the steps 310 through 316 five additional times in this example.

Once steps 310 through 316 have been performed for all vectors of the vector (t), the key generation algorithm 300 determines if the vector (c) has an inverse vector on the Galois Field $2^8$. It should be noted that one skilled in the art can readily calculate whether or not the vector (c) has an inverse vector on Galois Field $2^8$. In this step, when the inverse vector on the Galois Field $2^8$ is determined, the values of this vector, which is denoted as vector $(c)^{-1}$, are used as the coefficients for the variables in the polynomial used to generate a key during decryption. If the vector (c) does not have an inverse vector on the Galois Field $2^8$, the steps 306 through 320 are repeated. If the key generation algorithm has an inverse vector in the Galois Field $2^8$, then a step 322 is performed.

Turning back to the example, the vector (c) having the values (255, 3, 16) has an inverse vector in the step 320, which in the example is (1, 51, 111). Thus, in the example, the vector $(c)^{-1}$ is (1, 51, 111). As the vector (c) of (255, 3, 16) has an inverse vector $(c)^{-1}$ of (1, 51, 111), the key generation algorithm 300 performs the step 322.

In the step 322, the values for the vector (c) and the vector $(c)^{-1}$ are returned as the coefficients for the polynomial a(x) and the polynomial $a^{-1}(x)$ mentioned above. In particular, the coefficients corresponding to the vector (c) are used with a variable polynomial in order to generate a key to use during the encryption of data. Using the coefficients with the variables in the polynomial a(x), a key may be generated that is used with an encryption algorithm during the encryption of data. In particular, the generated key is used with an encryption algorithm to encrypt data. Furthermore, the coefficients corresponding to the vector $(c)^{-1}$ are used with a variable polynomial such as the variable $a^{-1}(x)$ in order to generate a key to use during the decryption of data. Here, the generated key is used with a decryption algorithm to decrypt the encrypted data.

Figure 4:
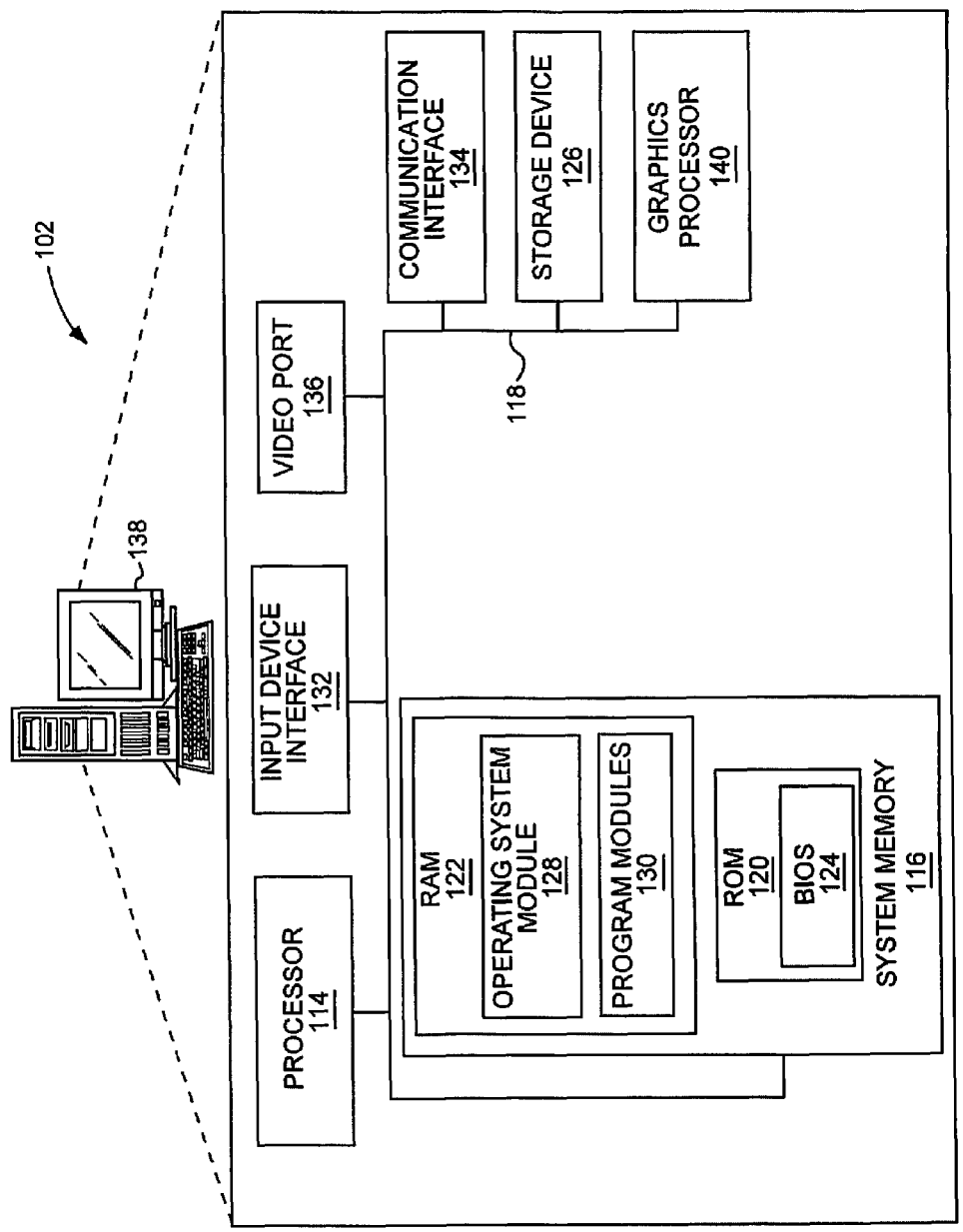
FIG. 4 is a block diagram of a client device according to one embodiment of the present invention.

FIG. 4 is a block diagram of the device 102 according to one embodiment of the present disclosure. It should be noted that while this discussion focuses on the device 102, this description is equally applicable to the device 104, where the device 104 includes identical components having identical functionality. Moreover the description in FIG. 4 is also applicable to the servers 110 and 112, where the servers 110 and 112 include the necessary components to operate as a hardware server and may or may not include all the components discussed with reference to FIG. 4, such as a display device and various input devices, or the like. The device 102 may comprise any computing or processing device capable of executing software instructions to implement the functionality described herein, such as, by way of non-limiting example, a work station, a desktop or laptop computer, a tablet computer, or the like. The device 102 includes a processor 114, a system memory 116, and a system bus 118. The system bus 118 provides an interface for system components including, but not limited to, the system memory 116 and the processor 114. The processor 114 may be any commercially available or proprietary processor. Dual microprocessors and other multi-processor architectures may also be employed as the processor 114.

The system bus 118 may be any of several types of bus structures that may further interconnect to a memory bus (with or without a memory controller), a peripheral bus, and/or a local bus using any of a variety of commercially available bus architectures. The system memory 116 may include non-volatile memory 120 (e.g., read only memory (ROM), erasable programmable read only memory (EPROM), electrically erasable programmable read only memory (EEPROM), etc.) and/or volatile memory 122 (e.g., random access memory (RAM)). A basic input/output system (BIOS) 124 may be stored in the non-volatile memory 120, and can include the basic routines that help to transfer information between elements within the device 102. The volatile memory 122 may also include a high-speed RAM, such as static RAM, for caching data.

The device 102 may further include the computer-readable storage device 126, which may comprise, by way of non-limiting example, an internal hard disk drive (HDD) (for example, an enhanced integrated drive electronics (EIDE) HDD or serial advanced technology attachment (SATA) HDD), a flash memory, or the like. The computer-readable storage device 126 and other drives, sometimes referred to as computer-readable or computer-usable media, provide non-volatile storage of data, data structures, computer-executable instructions, and the like. Although for purposes of illustration the description of the computer-readable storage device 126 above refers to a HDD, it should be appreciated by those skilled in the art that other types of media which are readable by a computer, such as zip disks, magnetic cassettes, flash memory cards, cartridges, a Universal Serial Bus memory stick, and the like, may also be used in the operating environment, and further, that any such media may contain computer-executable instructions for performing novel functionality as disclosed herein.

A number of modules can be stored in the computer-readable storage device 126 and in the volatile memory 122, including an operating system module 128 and one or more program modules 130, which may implement the functionality described herein in whole or in part. It is to be appreciated that the embodiments can be implemented with various commercially available operating system modules 128 or combinations of operating system modules 128.

All or a portion of the embodiments may be implemented as a computer program product stored on a non-transitory computer-usable or computer-readable storage medium, such as the computer-readable storage device 126, which may include complex programming instructions, such as complex computer-readable program code, configured to cause the processor 114 to carry out the functionality described herein. Thus, the computer-readable program code can comprise software instructions for implementing the functionality of the embodiments described herein when executed on the processor 114. The processor 114, in conjunction with the program modules 130 in the volatile memory 122, may serve as a control system for the device 102 that is configured to or adapted to implement the functionality described herein.

A user may be able to enter commands and information into the device 102 through one or more input devices, such as, for example, a keyboard (not illustrated), a pointing device such as a mouse (not illustrated), a touch-sensitive surface (not illustrated), or the like. Other input devices may include a microphone, an infrared (IR) remote control, a joystick, a game pad, a stylus pen, or the like. These and other input devices may be connected to the processor 114 through an input device interface 132 that is coupled to the system bus 118, but can be connected by other interfaces such as a parallel port, an Institute of Electrical and Electronic Engineers (IEEE) 1394 serial port, a Universal Serial Bus (USB) port, an IR interface, and the like.

The device 102 may also include a communication interface 134 suitable for communicating with a network. The device 102 may also include a video port 136 that drives a display device 138. The video port 136 may receive imagery, such as water surface imagery, from a graphics processor 140. The display device 132 may be separate from the device 102, or may be integrated with the device. Non-limiting examples of the display device 138 include an LCD or plasma monitor, a projector, or a head-mounted display.

Those skilled in the art will recognize improvements and modifications to the preferred embodiments of the present disclosure. All such improvements and modifications are considered within the scope of the concepts disclosed herein and the claims that follow.

What is claimed is:

1. A method of encrypting data comprising:
    generating a key, wherein generating the key includes:
        (A) determining a number of coefficients for a polynomial having a number of variables;
        (B) selecting a polynomial level from the number of coefficients;
        (C) selecting a first value based on the polynomial level;
        (D) generating a vector (c) having coefficients based on the polynomial level;
        (E) generating a vector (t) based on the polynomial level;
        (F) generating a vector (t') based on a product of the vector (c) and the vector (t);
        (G) calculating a second value based on the first value, the vector (t), and the product, wherein calculating the second value comprises:
            (i) summing non-zero values of the vector (t) in order to generate a vector (t) sum;
            (ii) summing non-zero values of the vector (t') in order to generate a vector (t') sum;
            (iii) comparing the first value with the values of the vector (t) sum and the vector (t') sum; and
            (iv) selecting the second value based on the comparison of the first value with the values of the vector (t) sum and the vector (t') sum;
        (H) comparing the second value with the polynomial level and repeating operations (C)-(G) when the second value is less than the polynomial level;
        (I) returning the coefficients of the vector (c) as the number of coefficients for the polynomial, wherein the coefficients are used with the polynomial to generate the key; and
    encrypting the data using the key such that the encrypted data is transmitted from a first device to a second device over a network.

2. The method as recited in claim 1, wherein the value that is selected based on the polynomial level is selected when the value is larger than twice a value associated with the polynomial level.

3. The method as recited in claim 1, wherein the polynomial level has a numerical value and the vector (c) includes a number of coefficients where the number of coefficients is equal to the numerical value of the polynomial level.

4. The method as recited in claim 1, wherein the polynomial level has a numerical value and the vector (t) has a binary format and generating the vector (t) further comprises generating a plurality of vectors where a number of the plurality of vectors is based on the numerical value.

5. The method of claim 4, wherein the method further comprises:
    determining if there are additional vectors of vector (t) after comparing the second value with the polynomial level.

6. The method of claim 1, the method further comprising determining if the vector (c) has an inverse vector $(c)^{-1}$ on a Galois Field $2^8$.

7. The method of claim 6, wherein when the vector (c) has an inverse vector $(c)^{-1}$ on the Galois Field $2^8$, the inverse vector $(c)^{-1}$ has coefficients, the method further comprises:
    returning the coefficients of the vector $(c)^{-1}$ as the number of coefficients for the polynomial, wherein the coefficients are used with the polynomial to generate a key to be used during decryption.

8. The method of claim 6, further comprising repeating operations (C)-(I) when the vector (c) does not have an inverse vector $(c)^{-1}$ on the Galois Field $2^8$.

9. A method of encrypting data comprising:
    generating a key, wherein generating the key includes:
        (A) determining a number of variables for a polynomial having a number of variables;
        (B) selecting a polynomial level having a numerical value from the number of coefficients;
        (C) selecting a first value based on the polynomial level;
        (D) generating a vector (c) having a number of coefficients where the number of coefficients is equal to the numerical value of the polynomial level;
        (E) generating a plurality of vectors (t) each having a binary format where a number of the plurality of vectors is based on the numerical value of the polynomial level;
        (F) generating a vector (t') based on a product of the vector (c) and a vector (t) of the plurality of vectors (t);
        (G) calculating a second value based on the first value, the vector (t), and the product, wherein calculating the second value comprises:
            (i) summing non-zero values of the vector (t) in order to generate a vector (t) sum;
            (ii) summing non-zero values of the vector (t') in order to generate a vector (t') sum;
            (iii) comparing the first value with the values of the vector (t) sum and the vector (t') sum; and
            (iv) selecting the second value based on the comparison of the first value with the values of the vector (t) sum and the vector (t') sum;
        (H) comparing the second value with the polynomial level and repeating operations (C)-(G) when the second value is less than the polynomial level;
        (I) returning the coefficients of the vector (c) as the number of coefficients for the polynomial;

encrypting the data using the key such that the encrypted data is transmitted from a first device to a second device over a network.

10. The method as recited in claim 9, wherein the value that is selected based on the polynomial level is selected when the value is larger than twice a value associated with the polynomial level.

11. The method of claim 9, wherein the method further comprises: determining if there are additional vectors of vector (t) after comparing the second value with the polynomial level.

12. The method of claim 9, the method further comprising determining if the vector (c) has an inverse vector $(c)^{-1}$ on a Galois Field $2^8$.

13. The method of claim 12, wherein when the vector (c) has an inverse vector $(c)^{-1}$ on the Galois Field $2^8$, the inverse vector $(c)^{-1}$ has coefficients, the method further comprises:
   returning the coefficients of the vector $(c)^{-1}$ as the number of coefficients for the polynomial, wherein the coefficients are used with the polynomial to generate a key to be used during decryption.

14. The method of claim 12, further comprising repeating operations (C)-(I) when the vector (c) does not have an inverse vector $(c)^{-1}$ on the Galois Field $2^8$.

* * * * *